(12) United States Patent
Yoshihara et al.

(10) Patent No.: US 7,175,948 B2
(45) Date of Patent: Feb. 13, 2007

(54) COLORING MATERIAL AND COLOR FILTER

(75) Inventors: Toshio Yoshihara, Shinjuku-Ku (JP); Kiyoshi Itou, Shinjuku-Ku (JP); Kazuhiko Nakamura, Shinjuku-Ku (JP); Minoru Furukawa, Yotsukaido (JP); Abul Iqbal, Arconciel (CH); Zhimin Hao, Riehen (CH)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 10/642,212

(22) Filed: Aug. 18, 2003

(65) Prior Publication Data

US 2004/0050294 A1    Mar. 18, 2004

Related U.S. Application Data

(62) Division of application No. 09/640,175, filed on Aug. 17, 2000, now Pat. No. 6,656,985.

(30) Foreign Application Priority Data

Aug. 26, 1999  (JP) ................................. 11-240390
Aug. 26, 1999  (JP) ................................. 11-240508
Aug. 26, 1999  (JP) ................................. 11-240510

(51) Int. Cl.
*G02B 5/20*    (2006.01)

(52) U.S. Cl. .......................................................... 430/7
(58) Field of Classification Search ................... 430/7; 359/891

See application file for complete search history.

(56) References Cited

U.S. PATENT DOCUMENTS 5,840,449 A  *  11/1998  Zambounis et al. ............ 430/7
5,879,855 A        3/1999  Schadeli et al. .......... 430/270.1

* cited by examiner

*Primary Examiner*—John A. McPherson
(74) *Attorney, Agent, or Firm*—Oliff & Berridge, PLC

(57) ABSTRACT

There are provided a pigment-containing coloring material stably dispersible in a high concentration in various organic solvents, and a process for producing the same. The production process of the coloring material is characterized by comprising the steps of: providing a solution comprising (1) a soluble pigment precursor which is convertible into an insoluble pigment, (2) a solvent capable of dissolving the soluble pigment precursor therein, and (3) a stabilizing agent comprising an organic compound having a structure or a functional group capable of stabilizing the dispersibility of the insolubilized pigment in the solvent; and converting said soluble pigment precursor into an insoluble pigment to obtain the coloring material containing the insolubilized pigment dispersed stably in the solvent.

9 Claims, 5 Drawing Sheets

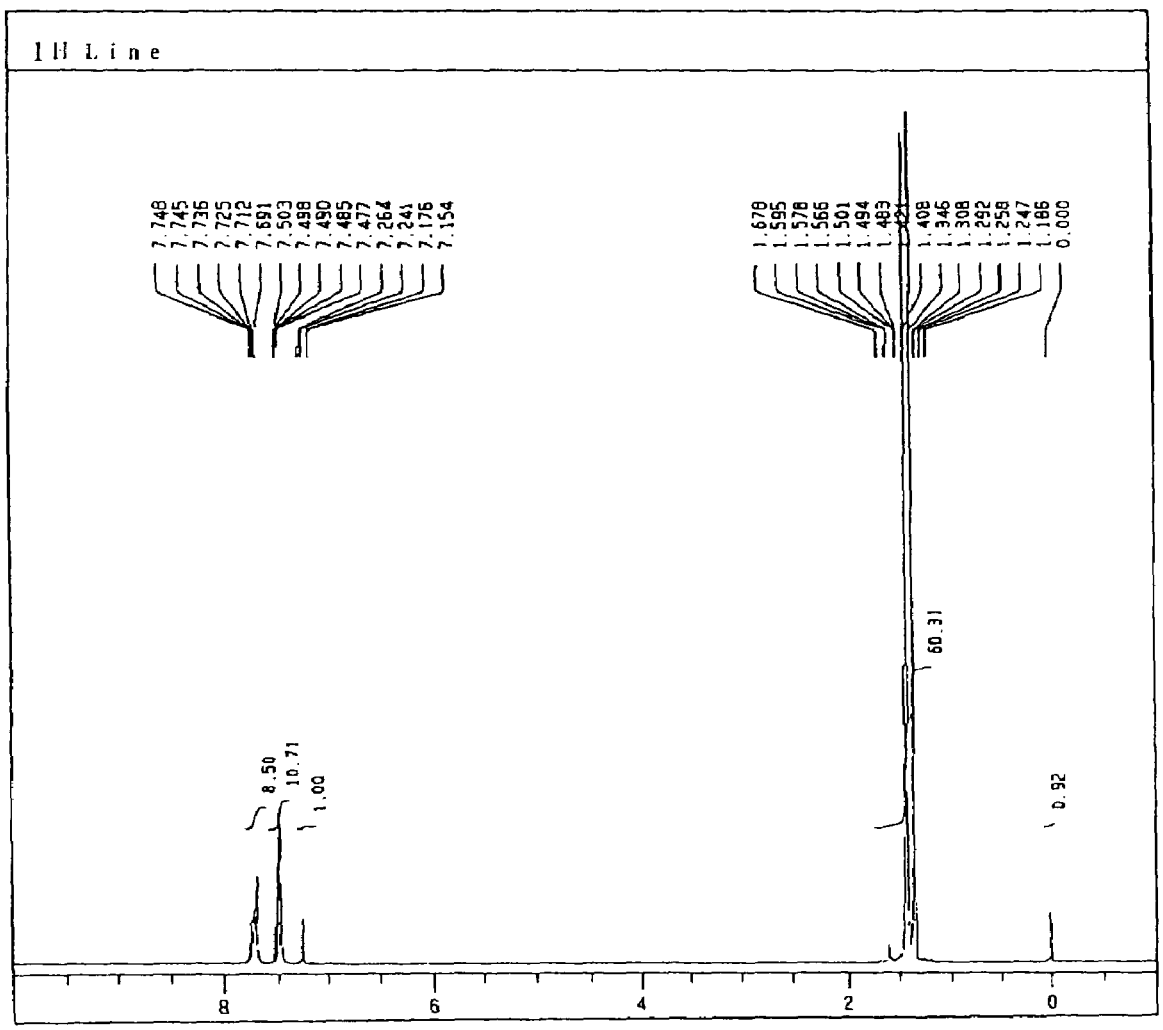
F I G. 1

COLORING MATERIAL AND COLOR FILTER

TECHNICAL FIELD

The present invention relates to a pigment-containing coloring material stably dispersible in high concentration in various organic solvents, and a process for producing the same.

This coloring material, as with conventional dyes or pigments, is used, either solely or after addition of an inverter component, as various coating systems, coating materials, printing inks, ink jet printing inks, toners, or compositions. In particular, color filters produced from the coloring material according to the present invention can have improved spectral characteristics (higher color purity, higher transmittance, and higher contrast) than conventional color filters.

Thus, the present invention relates to a color filter possessing excellent spectral characteristics (higher color purity, higher transmittance, and higher contrast) comprising a colored layer containing a pigment stably dispersible in high concentration in various organic solvents, particularly to a color filter for use in color liquid crystal displays.

BACKGROUND OF THE INVENTION

In general, dyes have unsatisfactory resistance to light, heat, solvents, and chemicals. On the other hand, pigments involve problems of a lack of dispersion, dispersion stability, transparency, profile sharpness of absorption spectra or transmission spectra, or diffusion. In this respect, Japanese Patent Laid-Open No. 188234/1995 or Japanese Patent Laid-Open No. 6242/1996 proposes a novel coloring material having both an advantage of dyes and an advantage of pigments (good solubility of dyes and good weathering resistance of pigments) through the use of a soluble pigment precursor which can be converted to insoluble pigment particles having a size of nanometers by a chemical, thermal, or photolytic method or by laser or other beam irradiation.

The use of a coloring material disclosed in Japanese Patent Laid-Open No. 188234/1995 or Japanese Patent Laid-Open No. 6242/1996 permits the pigment to be evenly dispersed in high concentration in a polymer layer, but on the other hand, there is a disadvantage that elimination partially occurs due to volatilization of the precursor upon conversion of the soluble pigment precursor in the polymer layer to insoluble pigment particles by chemical, thermal, photolytic, or radiation induced means, leading to an uneven reduction in layer thickness. In the case of the soluble pigment precursor, in general, a bulky functional group is introduced to render the precursor soluble in a solvent, and the elimination of the bulky functional group converts the precursor to an insoluble pigment. This renders the above unfavorable tendency significant. Further, when the eliminated functionality is present in a large amount in the layer, there is a fear of the influence of the functionality. For these reasons, it is difficult to apply the coloring material to the field of applications where dimensional accuracy, particularly good coating smoothness are required, such as color filters.

When the soluble pigment is converted to the insoluble pigment in a solvent before coating formation from the viewpoint of avoiding this problem, the precipitation of the pigment extremely lowers the solubility of the pigment in the solvent, leading to the production of coagulation sediment. Therefore, the storage stability is poor, and the preparation of a highly concentrated solution per se becomes difficult.

Meanwhile, in the case of liquid crystal displays, a liquid crystal material is sealed into a gap of about 1 to 10 μm between glass or other transparent substrates provided with transparent electrodes, and the liquid crystal is aligned in a given direction by a voltage applied across the electrodes to form transparent portions and opaque portions, thereby displaying an image. For color liquid crystal displays, a color filter for three primary colors of light is provided on any one of the transparent electrode substrates, and the three primary colors are added by shutter operation of the liquid crystal to display desired colors.

The color filter used in the color liquid crystal display comprises a transparent substrate, a colored layer, a protective layer, and a transparent conductive layer stacked in that order. The color filter and electrodes or transparent electrodes provided with a thin film transistor, which face colored pixels of three primary colors of RGB, are held while leaving a gap of several μm therebetween, and a liquid crystal material is sealed between the gap to form a liquid crystal display.

The colored pixels provided in the color filter are generally formed of a specific colorant, such as a dye or a pigment, in combination with a suitable resin, a binder, a polymer and/or an additive. Dyes generally have unsatisfactory resistance to light, heat, solvents, and chemicals. On the other hand, pigments involve problems of a lack of dispersion, dispersion stability, transparency, profile sharpness of absorption spectra or transmission spectra, or diffusion. In this respect, Japanese Patent Laid-Open No. 188234/1995 or Japanese Patent Laid-Open No. 6242/1996 proposes a coloring material having both an advantage of dyes and an advantage of pigments (good solubility of dyes and good weathering resistance of pigments) through the use of a soluble pigment precursor which can be converted to insoluble pigment particles having a size of nanometers by chemical, thermal, or photolytic means or by laser or other beam irradiation.

The use of a coloring material disclosed in Japanese Patent Laid-Open No. 188234/1995 or Japanese Patent Laid-Open No. 6242/1996 permits the pigment to be evenly dispersed in high concentration in a polymer layer of the colored layer constituting the color filter, but on the other hand, there is a disadvantage that elimination partially occurs due to volatilization of the precursor upon conversion of the soluble pigment precursor in the polymer layer to insoluble pigment particles by chemical, thermal, photolytic, or radiation induced means, leading to an uneven reduction in layer thickness. In the case of the soluble pigment precursor, in general, a bulky functional group is introduced to render the precursor soluble in a solvent, and the elimination of the bulky functional group converts the precursor to an insoluble pigment. This renders the above unfavorable tendency significant. Further, when the eliminated functionality is present in a large amount in the layer, there is a fear of the influence of the functionality. For these reasons, it is difficult to apply the coloring material to the field of applications where dimensional accuracy, particularly good coating smoothness are required, such as color filters.

When the soluble pigment is converted to the insoluble pigment in a solvent before coating formation from the viewpoint of avoiding this problem, the precipitation of the pigment extremely lowers the solubility of the pigment in the solvent, leading to the production of coagulation sediment. Therefore, the storage stability is poor, and the preparation of a highly concentrated solution per se becomes difficult.

SUMMARY OF THE INVENTION

First Invention

The first invention has been made under these circumstances, and can overcome the above problems, although the reason why the above problems can be solved has not been fully elucidated. Specifically, according to the first invention, there are provided a coloring material comprising an insolubilized pigment dispersed stably in a solvent, said coloring material being produced by, in dissolving (1) a soluble pigment precursor, which is convertible into an insoluble pigment, in (2) a solvent capable of dissolving the soluble pigment precursor therein, allowing (3) a stabilizing agent, comprising an organic compound having a structure or a functional group capable of stabilizing the dispersibility of the insolubilized pigment in the solvent, to further exist, and, in this system, converting said soluble pigment precursor into an insoluble pigment, and a process for producing the same. The first invention further includes a coloring material wherein the above coloring material has been concentrated to obtain a solidified coloring material, and a process for producing the same. The first invention further includes a coloring material wherein the above solidified coloring material has been redispsersed in a solvent, and a process for producing the same. The first invention further includes a coloring material comprising an adduct formed by interaction between a soluble pigment precursor convertible to the insoluble pigment and a stabilizing agent comprising an organic compound having a structure or a functional group capable of stabilizing the dispersibility of the insolubilized pigment in the solvent. In particular, the coloring material according to the present invention can solve the above problems, and can be used in high concentration to easily form a pigment-dispersed polymer layer having excellent coating smoothness. This makes it possible to apply the coloring material to color filters having improved spectral characteristics (higher color purity, higher transmittance, and higher contrast) as compared with color filters using conventional coloring materials.

Second Invention

According to the second invention, there is provided a color filter using a coloring material comprising an insolubilized pigment dispersed stably in a solvent, said coloring material being produced by, in dissolving (1) a soluble pigment precursor, which is convertible into an insoluble pigment, in (2) a solvent capable of dissolving the soluble pigment precursor therein, allowing (3) a stabilizing agent, comprising an organic compound having a structure or a functional group capable of stabilizing dispersibility of the insolubilized pigment in the solvent, to further exist, and, in this system, converting said soluble pigment precursor into an insoluble pigment.

The coloring material may be in the form of a solidified coloring material produced by concentrating the above coloring material, or may be in the form of a dispersion produced by redispersing the resultant solidified coloring material in a solvent. The second invention further includes a technique wherein the coloring material is an adduct formed by interaction between a soluble pigment precursor convertible to the insoluble pigment and a stabilizing agent comprising an organic compound having a structure or a functional group capable of stabilizing dispersibility of the insolubilized pigment in the solvent. In particular, the coloring material according to the present invention can solve the above problems, and can be used in high concentration to easily form a pigment-dispersed polymer layer having excellent coating smoothness. This makes it possible to produce color filters having improved spectral characteristics (higher color purity, higher transmittance, and higher contrast) as compared with conventional color filters.

Third Invention

The third invention includes a color filter comprising a colored layer as colored pixels provided on a transparent substrate, the colored layer containing a specific pyrrolo[3,4-c]pyrrole derivative.

In the color filter according to this aspect of the present invention, a specific pyrrolo[3,4-c]pyrrole compound described later is contained as a pigment in at least one colored pixel. The particle diameter of the pigment is not more than the wavelength of incident light, that is, in the range of 1 nm to 300 nm in terms of average particle diameter, and, at the same time, the particle diameter distribution of the pigment falls within a specific range, that is, is within ±30% of the average particle diameter. By virtue of this, a lowering in transmittance caused by light scattering can be suppressed, and, in its turn, a much improvement in transparency of the formed colored pixels can be attained over the transparency of colored pixels obtained using conventional pigment-dispersed systems.

Further, the pigment produced from the coloring material has excellent display quality, and thus can easily form colored pixels which have ideal spectral characteristics as a color filter, specifically have a spectral characteristic curve in a visible region such that the light transmittance in a light absorption region is in the range of 0 to 20% while the light transmittance in a light transmission region is not less than 50%.

The amount of the pigment produced from the coloring material can be regulated by regulating the solid content of the matrix, specifically can be regulated in the range of 10 to 90% by weight, and can be easily used in higher concentration. Therefore, the contrast can also be significantly improved over the contrast attained in the conventional pigment-dispersed system, and can be set, for example, at not less than 2,000.

In general, dyes have unsatisfactory resistance to light, heat, solvents, and chemicals. On the other hand, pigments involve problems of a lack of dispersion, dispersion stability, transparency, profile sharpness of absorption spectra or transmission spectra, or diffusion. In this respect, Japanese Patent Laid-Open No. 188234/1995 proposes a pigment precursor which has a carbamate group and can be converted into a corresponding diketopyrrolopyrrole pigment having a size of nanometers by chemical, thermal, or photolytic means or by laser or other beam irradiation.

When the coloring material disclosed in Japanese Patent Laid-Open No. 188234/1995 is used, the affinity of the pigment precursor particularly for aprotic solvents is imparted by suitably selecting substituents D and E in formula (I). In this case, in order to broaden the range of selection of the solvent and, at the same time, to stably and homogeneously disperse the pigment in high concentration, the substituent should be made bulky to such an extent that the half or more of the molecular weight of the whole chemical compound is accounted for by this substituent. The introduction of the bulky substituent into the pigment, however, is very difficult. Further, these introduced substituents are finally eliminated by a chemical, thermal, photolytic, or radiation induced method. Therefore, finally increasing the pigment concentration becomes very difficult.

These adverse effects are particularly significant when the pigment precursor is converted to a pigment in a polymer layer. This makes it difficult to apply the pigment to the field of applications where good dimensional accuracy, particularly good coating smoothness, is required, such as color filters.

The present invention has been made under these circumstances, and can overcome the above problems, although the principle on which the problems can be overcome has not been fully elucidated. Specifically, according to the present invention, chemically cleaving a bond between N and C=O in at least one pyrrolo[3,4-c]pyrroleketopyrrole group of formula (I) can enhance the affinity of the compound per se for various solvents, and thus enables a pigment-dispersed polymer layer having a high pigment content and excellent coating smoothness to be easily formed. This can realize a color filter having significantly improved spectral characteristics (higher color purity, higher transmittance, and higher contrast) over the conventional color filters.

BRIEF DESCRIPTION OF THE DRAWINGS

FIG. 1 is a $^1$H-NMR spectrum chart of a solidified coloring material produced in an example of the present invention.

BEST MODE FOR CARRYING OUT THE INVENTION

First Invention

Figure 2:
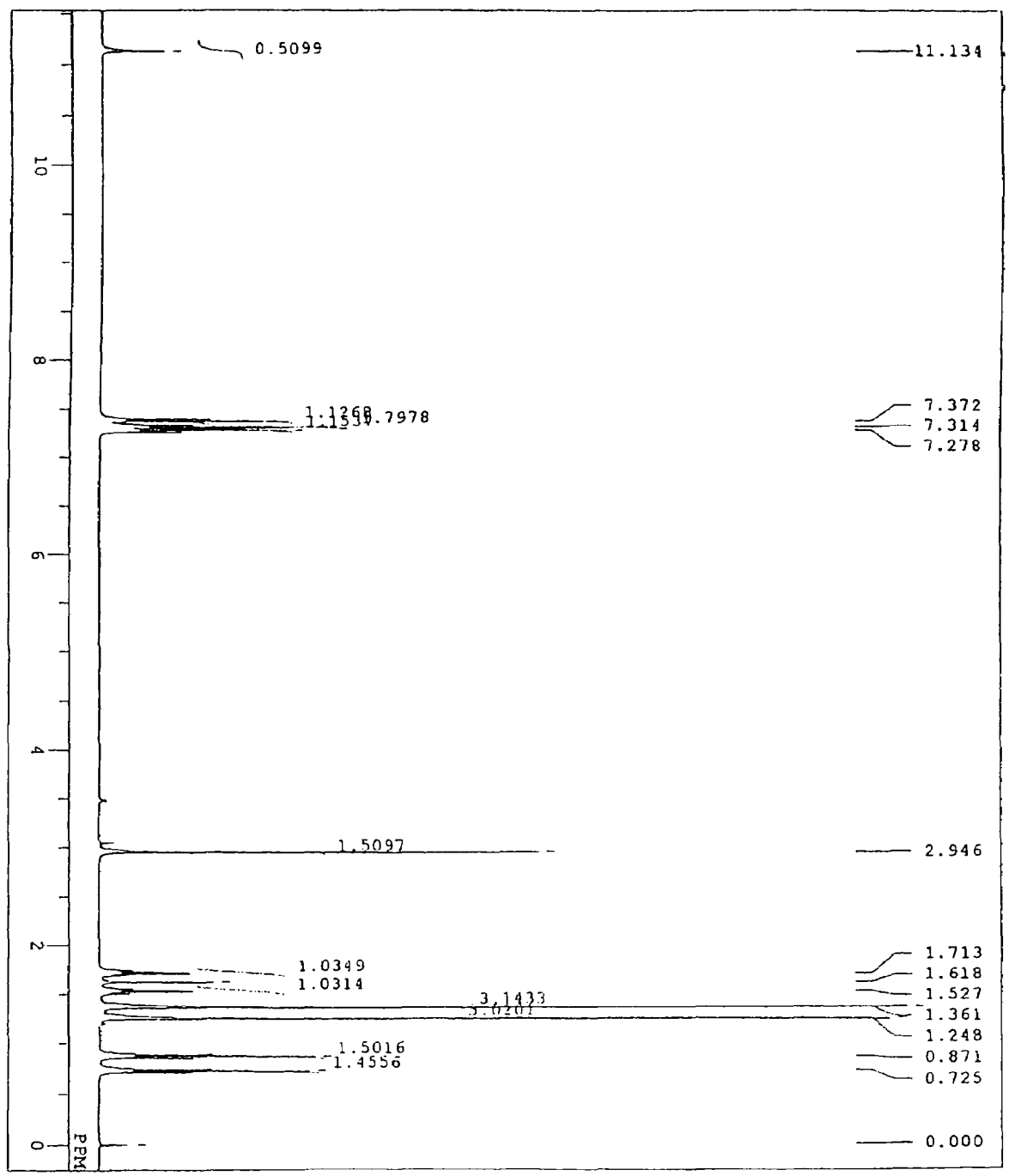
FIGS. 2 to 5 are $^1$H-NMR spectrum charts of coloring materials produced in examples of the present invention.

The present invention is attained by dissolving, in a solvent to saturation, an organic compound having a structure or a functional group capable of stabilizing the dispersibility of an insolubilized pigment in the solvent and a soluble pigment precursor convertible into an insoluble pigment and applying chemical means, thermal means, photolytic means, radiation induced means, or means comprising a combination of two or more of the above means to convert at least a part of the precursor to a pigment. By virtue of the presence of the organic compound having a structure or a functional group capable of stabilizing the dispersibility of an insolubilized pigment in the solvent, the coloring material, even when concentrated after the conversion of the soluble precursor to the pigment, is free from any precipitate and any significant floating matter. Therefore, a highly concentrated dispersion of the soluble precursor, at least a part of which has been converted to a pigment, can be easily realized. This can overcome the above problems caused by conversion to an insoluble pigment, for example, after coating formation.

The coloring material according to the present invention, even when concentrated, can be stably present. When the coloring material is further concentrated, the coloring material is precipitated as solid matter. This solid matter is sometimes crystalline, can be easily isolated from the dispersion, and as such can be stably stored for a long period of time. The isolation of the solid matter from the dispersion permits impurities, such as excess stabilizing agent, to be easily removed, for example, by washing.

Further, the solidified coloring material according to the present invention, together with a solvent in which an insoluble pigment per se cannot be easily dispersed, can easily constitute a stable dispersion or a highly concentrated solution thereof without providing any complicate step of dispersion or use of any dispersant for a pigment.

Although the reason for this has not been fully elucidated, the reason is believed to reside in that, in the course of conversion of the soluble pigment precursor into the insoluble pigment, interaction on a molecular level between the stabilizing agent and the insoluble pigment results in the formation of an adduct which can impart the solubility of the stabilizing agent in the solvent to the insoluble pigment. In this adduct, the insoluble pigment strongly interacts with the stabilizing agent. Therefore, the adduct can be isolated as a crystalline solvent-soluble solid.

Further, since the coloring material according to the present invention requires neither the provision of any complicate step of dispersion nor the use of any dispersant for a pigment, a mixed dispersion of a plurality of coloring materials and a highly concentrated solution thereof can be easily prepared. This facilitates the regulation of hue of the coloring material and the like.

All the soluble pigment precursors disclosed in Japanese Patent Laid-Open No. 188234/1995 or Japanese Patent Laid-Open No. 6242/1996 can be used in the present invention. Specifically, soluble pigment precursors usable in the present invention are those convertible to insoluble pigments by a chemical, thermal, or photolytic method or by irradiation induction means, more specifically compounds represented by formula (I):

wherein x is a number of 1 to 4; A represents a residue of quinacridone, anthraquinone, perylene, indigo, quinophthalone, isoindolinone, dioxazine, diketopyrrololylol, or a colorant of azo series. These residues are attached to group Bs, wherein the number of Bs is x, through a nitrogen atom as a part of A. B represents a group attached to A, and is represented by any one of formulae

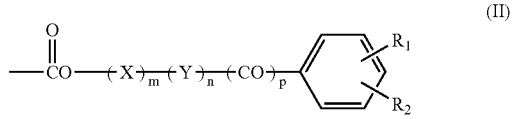

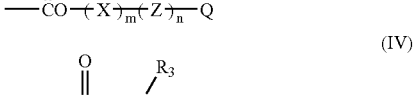

In the formulae (II), (III), and (IV), m, n, and p are each independently of one another 0 or 1; X is $C_1$–$C_4$ alkylene or $C_2$–$C_8$ alkenylene; Y is a group —V—$(CH_2)_q$—; Z is a group —V—$(CH_2)_r$— wherein V is $C_3$–$C_6$ cycloalkylene; q is 1 to 6; r is a number of 0 to 6; $R_1$ and $R_2$ are each independently of the other hydrogen, $C_1$–$C_6$ alkyl, $C_1$–$C_4$ alkoxy, halogen, CN, $NO_2$, unsubstituted phenyl or phenoxy, or phenyl or phenoxy which is substituted by $C_1$–$C_4$ alkyl, $C_1$–$C_4$ alkoxy, or halogen; and Q is hydrogen, CN, $Si(R_4)_3$, a group $C(R_5)(R_6)(R_7)$ wherein $R_5$, $R_6$, and $R_7$ are each independently of one another hydrogen or halogen with the proviso that at least one of $R_5$, $R_6$, and $R_7$ is halogen, a group of formula

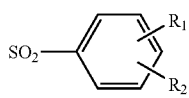

wherein $R_1$ and $R_2$ are as defined above, a group $SO_2R_8$ or $SR_8$ wherein $R_8$ is $C_1$–$C_4$ alkyl, a group $CH(R_9)_2$ wherein $R_9$ is unsubstituted phenyl or phenyl which is substituted by $C_1$–$C_4$ alkyl, $C_1$–$C_4$ alkoxy, or halogen, or a group of formula

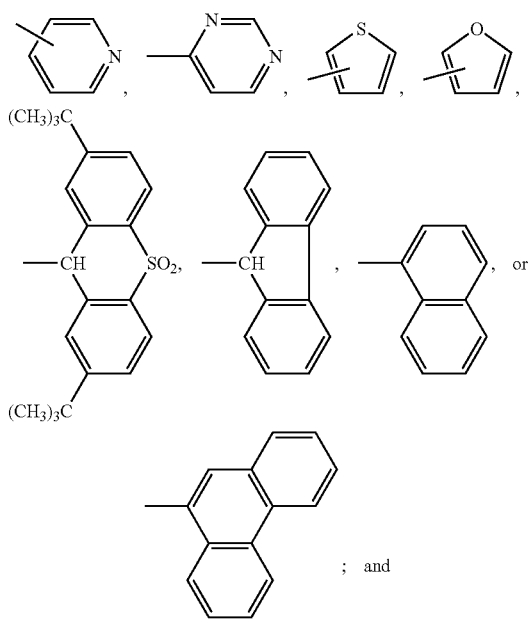

; and $R_3$ and $R_4$ are each independently of the other hydrogen, $C_1$–$C_{18}$ alkyl, or a group of formula

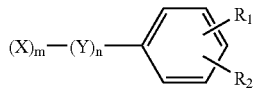

wherein X, Y, $R_1$, $R_2$, m, and n are as defined above, or $R_3$ and $R_4$, together with the linking nitrogen atom, form pyrrolidinyl, piperidinyl, or morpholinyl radical; and $A(B)_x$ may additionally contain

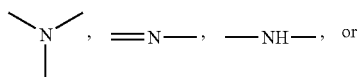

—$NH_2$ group.

Further, in addition to the above method, the soluble pigment precursor usable in the present invention may also be produced from an insoluble pigment having a polar group selected from the group consisting of primary amines, secondary amines, cyclic amines, and a hydroxyl group.

Conventional organic compounds, oligomers, or polymers may be preferably used solely or in a combination of two or more as the stabilizing agent comprising an organic compound having a structure or a functional group capable of stabilizing the dispersibility of the insoluble pigment in a solvent according to the present invention, so far as the stabilizing agent has a group selected from the group consisting of >CO, —$NH_2$, >NH, >N—, =$N^+$<, —$CONH_2$, —CONH—, —NHCOO—, >NCOO—, —NHCONH—, (—NHCO)$_2$N—, and —OH.

The stabilizing agent is preferably characterized by having an amine value, more preferably characterized by having an amine value of not less than 1 mg KOH/g and not more than 230 mg KOH/g. Most preferably, the stabilizing agent has the above amine value and, at the same time, a urethane bond. Specific examples of stabilizing agents include acrylic esters, methacrylic esters, vinyl esters, vinylcarbazole and derivatives thereof, vinylpyrrolidone and derivatives thereof, vinylpyridine and derivatives thereof, acrylamide and derivatives thereof, vinylimidazole and derivatives thereof, ethyleneimine and derivatives thereof, phenol compounds and derivatives thereof, urea and modified ureas, melamine, amides, amide-imide and derivatives thereof, amino acids, and urethane compounds, and oligomers or polymers of the above compounds. They may be used solely or in a combination of two or more.

Further, the stabilizing agent according to the present invention, after the introduction of a reactive double bond group, may also be used as a binder component which is used to form a coating followed by polymerization with other monomer or reactive polymer. At that time, the amount of the reactive double bond group introduced is preferably in the range of 0.1 to 20 per molecule on average.

The soluble pigment precursor and the stabilizing agent are mixed together in a weight ratio of 0.01:99.99 to 80:20, preferably in a weight ratio of 1:99 to 70:30, more preferably in a weight ratio of 5:95 to 60:40, most preferably in a weight ratio of 10:90 to 50:50.

Examples of suitable solvents usable herein include: ethers, such as tetrahydrofuran and dioxane; glycol ethers, such as ethylene glycol methyl ether, ethylene glycol ethyl ether, diethylene glycol monomethyl ether, and diethylene glycol monoethyl ether; aprotic solvents, such as acetonitrile, benzonitrile, N,N-dimethylformamide, nitrobenzene, N-methylpyrrolidone, halogenated aliphatic or aromatic hydrocarbons, such as trichloromethane, unsubstituted or alkyl-, alkoxy- or halogen-substituted benzene, such as xylene, anisole, and chlorobenzene, and aromatic N-heterocyclic compounds, such as pyridine, picoline, or quinoline; alcohols, such as methanol, ethanol, isobutanol, propylene glycol, and diacetone alcohol; carboxylic esters and lactones, such as propylene carbonate, ethyl acetate, butyl acetate, methoxypropyl acetate, methyl propionate, ethyl benzoate, γ-butyrolactone, and γ-valerolactone; sulfoxides, such as dimethyl suloxide; sulfones, such as dimethyl sulfone and diethyl sulfone; and ketones, such as dimethyl ketone, methyl ethyl ketone, cyclopentanone, and cyclohexanone. Further, monomers having various reactive functional groups may also be used. The coloring material according to the present invention is preferably regulated using one of or a mixture of the above-described solvents to a solid content of 1 to 90% by weight, preferably 5 to 80% by weight, more preferably 10 to 70% by weight, most preferably 20 to 60% by weight, based on the solution.

The soluble pigment precursor may be converted to an insoluble pigment by the addition of an acid, the addition of a base, by irradiation with an electromagnetic radiation, an electron beam, or a neutron, and/or by heating. The coloring material produced by conversion of the soluble pigment precursor to the insoluble pigment, even when a solution prepared by dissolving the soluble pigment precursor in a solvent to saturation is used, can be concentrated without causing noticeable precipitate. In general, the solution thus produced does not exhibit properties inherent in the pigment in such a state that the solution is coated on a suitable substrate. Although the reason for this has not been fully elucidated, the reason is believed to reside in that the insoluble pigment and the stabilizing agent interact with each other on a molecular level to form an adduct and, in this state, are stably present in the matrix. Further, in some cases, they come to have properties inherent in the pigment through a chemical reaction utilizing an acid or a base produced from various additives, irradiation with an electromagnetic radiation, for example, visible light, UV (ultraviolet light), laser beams, X-rays, electron beams, or neutrons, and/or heating.

The coloring material according to the present invention may be used as plastic materials, melts, spinning solutions, paint systems, positive- or negative-working UV resists, positive- or negative-working electron beam resists, coating materials, printing inks, for example, for screen printing, gravure printing, flexography, or offset printing, non-impact printing inks, for example, for ink jet printing or thermal transfer printing, toners, and coloring materials as compositions, particularly as color filters for liquid crystal displays using a resist.

In the production of color filters, a suitable binder component is used in combination with photolithography, ink jet recording, electrodeposition, sublimation dye thermal transfer recording (thermal dye transfer recording) or the like. The coloring material according to the present invention can be advantageously used in all of these cases.

Second Invention

The color filter according to the second invention is characterized by comprising a colored layer as colored pixels provided on a transparent substrate, said colored layer containing a coloring material, said coloring material being produced by providing a solution comprising (1) a soluble pigment precursor which is convertible into an insoluble pigment, (2) a solvent capable of dissolving the soluble pigment precursor therein, and (3) a stabilizing agent comprising an organic compound having a structure or a functional group capable of stabilizing the dispersibility of the insolubilized pigment in the solvent, and converting said soluble pigment precursor into an insoluble pigment.

The color filter according to another aspect of the present invention is characterized by comprising a colored layer as colored pixels provided on a transparent substrate, said colored layer containing a coloring material, said coloring material comprising an adduct formed by interaction between (1) an insoluble pigment produced by conversion from a soluble pigment precursor and (2) a stabilizing agent comprising an organic compound having a structure or a functional group capable of stabilizing the dispersibility of the insolubilized pigment in a solvent.

The colored layer referred to herein is formed of a transparent resin with an insoluble pigment produced from the coloring material being dispersed therein. The transparent resin may be a positive- or negative-working resist resin, a positive- or negative-working UV-curable resist, a positive- or negative-working electron beam-curable resist, or a polymer or a prepolymer. The transparent resin may contain a stabilizing agent comprising an organic compound having a structure or a functional group capable of stabilizing the dispersibility of an insolubilized pigment in the solvent. The stabilizing agent may be any of the positive- or negative-working resist resin, the positive- or negative-working UV-curable resist, the positive- or negative-working electron beam-curable resist, and the polymer or the prepolymer.

The coloring material used in the present invention may be produced by dissolving, in a solvent to saturation, an organic compound having a structure or a functional group capable of stabilizing the dispersibility of an insolubilized pigment in the solvent and a soluble pigment precursor convertible into an insoluble pigment and applying chemical means, thermal means, photolytic means, radiation induced means, or means comprising a combination of two or more of the above means to convert at least a part of the precursor to a pigment.

By virtue of the presence of the organic compound having a structure or a functional group capable of stabilizing the dispersibility of an insolubilized pigment in the solvent, the coloring material, even when concentrated after the conversion of the soluble precursor to the pigment, is free from any precipitate and any significant floating matter. Therefore, a highly concentrated dispersion of the soluble precursor, at least a part of which has been converted to a pigment, can be easily realized. This can overcome the above problems caused by conversion to an insoluble pigment, for example, after coating formation.

The coloring material used in the present invention, even when concentrated, is stably present. When the coloring material is further concentrated, the coloring material is precipitated as solid matter. This solid matter is sometimes crystalline, can be easily isolated from the dispersion, and as such can be stably stored for a long period of time. The isolation of the solid matter from the dispersion permits impurities, such as excess stabilizing agent, to be easily removed, for example, by washing.

Further, the solidified coloring material, together with a solvent in which an insoluble pigment per se cannot be easily dispersed, can easily constitute a stable dispersion or a highly concentrated solution thereof without providing any complicate step of dispersion or use of any dispersant for a pigment.

Although the reason for this has not been fully elucidated, the reason is believed to reside in that, in the course of conversion of the soluble pigment precursor into the insoluble pigment, interaction on a molecular level between the stabilizing agent and the insoluble pigment results in the formation of an adduct which can impart the solubility of the stabilizing agent in the solvent to the insoluble pigment. In this adduct, the insoluble pigment strongly interacts with the stabilizing agent. Therefore, the adduct can be isolated as a crystalline solvent-soluble solid.

Further, since this coloring material requires neither the provision of any complicated step of dispersion nor the use of any dispersant for a pigment, a mixed dispersion of a plurality of coloring materials and a highly concentrated solution thereof can be easily prepared. This facilitates the regulation of hue of the coloring material and the like.

All the soluble pigment precursors described in Japanese Patent Laid-Open No. 188234/1995 or Japanese Patent Laid-Open No. 6242/1996 can be used in the present invention. Specifically, soluble pigment precursors usable in the present invention are those convertible to insoluble pigments by a chemical, thermal, or photolytic method or by irradiation induction means, more specifically compounds represented by formula (I):

$$A(B)_x \qquad (I)$$

wherein x is a number of 1 to 4; A represents a residue of quinacridone, anthraquinone, perylene, indigo, quinophthalone, isoindolinone, dioxazine, diketopyrrololylol, or a colorant of azo series. These residues are attached to group Bs, wherein the number of Bs is x, through a nitrogen atom as a part of A. B represents a group attached to A, and is represented by any one of formulae

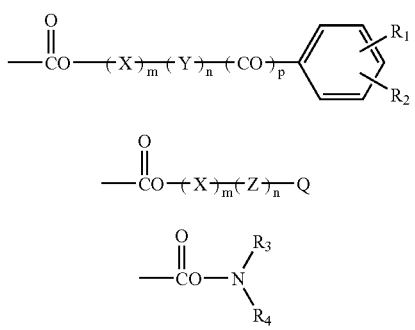

In the formulae (II), (III), and (IV), m, n, and p are each independently of one another 0 or 1; X is $C_1$–$C_4$ alkylene or $C_2$–$C_8$ alkenylene; Y is a group —V—$(CH_2)_q$—; Z is a group —V—$(CH_2)_r$— wherein V is $C_3$–$C_6$ cycloalkylene; q is 1 to 6; r is a number of 0 to 6; $R_1$ and $R_2$ are each independently of the other hydrogen, $C_1$–C6 alkyl, $C_1$–$C_4$ alkoxy, halogen, CN, $NO_2$, unsubstituted phenyl or phenoxy, or phenyl or phenoxy which is substituted by $C_1$–$C_4$ alkyl, $C_1$–$C_4$ alkoxy, or halogen; and Q is hydrogen, CN, $Si(R_4)_3$, a group $C(R_5)(R_6)(R_7)$ wherein $R_5$, $R_6$, and $R_7$ are each independently of one another hydrogen or halogen with the proviso that at least one of $R_5$, $R_6$, and $R_7$ is halogen, a group of formula

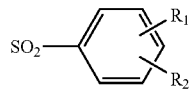

wherein $R_1$ and $R_2$ are as defined above, a group $SO_2R_8$ or $SR_8$ wherein $R_8$ is $C_1$–$C_4$ alkyl, a group $CH(R_9)_2$ wherein $R_9$ is unsubstituted phenyl or phenyl which is substituted by $C_1$–$C_4$ alkyl, $C_1$–$C_4$ alkoxy, or halogen, or a group of formula

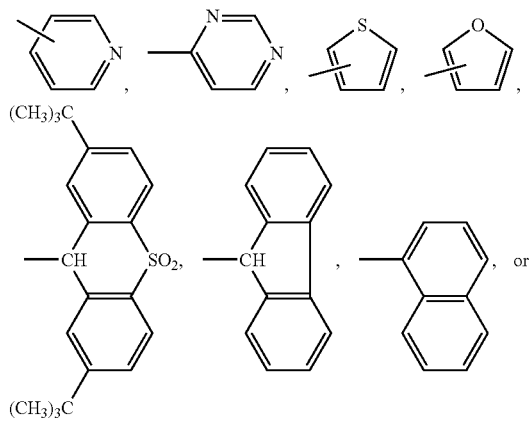

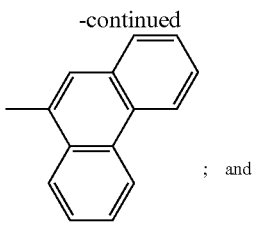

$R_3$ and $R_4$ are each independently of the other hydrogen, $C_1$–$C_{18}$ alkyl, or a group of formula

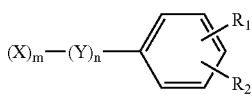

wherein X, Y, $R_1$, $R_2$, m, and n are as defined above, or $R_3$ and $R_4$, together with the linking nitrogen atom, form pyrrolidinyl, piperidinyl, or morpholinyl radical; and $A(B)_x$ may additionally contain

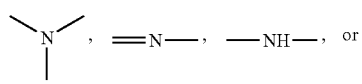

—$NH_2$ group.

Further, in addition to the above method, the soluble pigment precursor usable in the present invention may also be produced from an insoluble pigment having a polar group selected from the group consisting of primary amines, secondary amines, cyclic amines, and a hydroxyl group.

Conventional organic compounds, oligomers, or polymers may be preferably used solely or in a combination of two or more as the stabilizing agent comprising an organic compound having a structure or a functional group capable of stabilizing the dispersibility of the insoluble pigment in a solvent according to the present invention, so far as the stabilizing agent has a group selected from the group consisting of >CO, —$NH_2$, >NH, >N—, =N—, =$N^+$<, —$CONH_2$, —CONH—, —NHCOO—, >NCOO—, —NHCONH—, (—NHCO$)_2$N—, and —OH.

The stabilizing agent is preferably characterized by having an amine value, more preferably characterized by having an amine value of not less than 1 mg KOH/g and not more than 230 mg KOH/g. Most preferably, the stabilizing agent has the above amine value and, at the same time, a urethane bond. Specific examples of stabilizing agents include acrylic esters, methacrylic esters, vinyl esters, vinylcarbazole and derivatives thereof, vinylpyrrolidone and derivatives thereof, vinylpyridine and derivatives thereof, acrylamide and derivatives thereof, vinylimidazole and derivatives thereof, ethyleneimine and derivatives thereof, phenol compounds and derivatives thereof, urea and modified ureas, melamine, amides, amide-imide and derivatives thereof, amino acids, and urethane compounds, and oligomers or polymers of the above compounds. They may be used solely or in a combination of two or more.

Further, the stabilizing agent, after the introduction of a reactive double bond group thereinto, may also be used as a binder component which is used to form a coating followed by polymerization with other monomer or reactive polymer. At that time, the amount of the reactive double bond group introduced is preferably in the range of 0.1 to 20 per molecule on average.

The soluble pigment precursor and the stabilizing agent are mixed together in a weight ratio of 0.01:99.99 to 80:20, preferably in a weight ratio of 1:99 to 70:30, more preferably in a weight ratio of 5:95 to 60:40, most preferably in a weight ratio of 10:90 to 50:50.

Examples of suitable solvents usable herein include: ethers, such as tetrahydrofuran and dioxane; glycol ethers, such as ethylene glycol methyl ether, ethylene glycol ethyl ether, diethylene glycol monomethyl ether, and diethylene glycol monoethyl ether; aprotic solvents, such as acetonitrile, benzonitrile, N,N-dimethylformamide, nitrobenzene, N-methylpyrrolidone, halogenated aliphatic or aromatic hydrocarbons, such as trichloromethane, unsubstituted or alkyl-, alkoxy- or halogen-substituted benzene, such as xylene, anisole, and chlorobenzene, and aromatic N-heterocyclic compounds, such as pyridine, picoline, or quinoline; alcohols, such as methanol, ethanol, isobutanol, propylene glycol, and diacetone alcohol; carboxylic esters and lactones, such as propylene carbonate, ethyl acetate, butyl acetate, methoxypropyl acetate, methyl propionate, ethyl benzoate, γ-butyrolactone, and γ-valerolactone; sulfoxides, such as dimethyl suloxide; sulfones, such as dimethyl sulfone and diethyl sulfone; and ketones, such as dimethyl ketone, methyl ethyl ketone, cyclopentanone, and cyclohexanone. Further, monomers having various reactive functional groups may also be used. The coloring material according to the present invention is preferably regulated using one of or a mixture of the above-described solvents to a solid content of 1 to 90% by weight, preferably 5 to 80% by weight, more preferably 10 to 70% by weight, most preferably 20 to 60% by weight, based on the solution.

The soluble pigment precursor may be converted to an insoluble pigment by the addition of an acid, the addition of a base, by irradiation with an electromagnetic radiation, an electron beam, or a neutron, and/or by heating. The coloring material produced by conversion of the soluble pigment precursor to the insoluble pigment, even when a solution prepared by dissolving the soluble pigment precursor in a solvent to saturation is used, can be concentrated without causing noticeable precipitate. In general, the solution thus produced does not exhibit properties inherent in the pigment in such a state that the solution is coated on a suitable substrate. Although the reason for this has not been fully elucidated, the reason is believed to reside in that the insoluble pigment and the stabilizing agent interact with each other on a molecular level to form an adduct and, in this state, are stably present in the matrix. Further, in some cases, they come to have properties inherent in the pigment through a chemical reaction utilizing an acid or a base produced from various additives, irradiation with an electromagnetic radiation, for example, visible light, UV (ultraviolet light), laser beams, X-rays, electron beams, or neutrons, and/or heating.

The color filter according to the present invention is characterized in that colored pixels are constituted by a colored layer formed of a transparent resin with an insoluble pigment produced from the coloring material being dispersed therein.

The particle diameter of the insoluble pigment produced by the above method is not more than the wavelength of incident light, that is, in the range of 1 nm to 300 nm in terms of average particle diameter, and, at the same time, the particle diameter distribution of the pigment falls within a specific range, that is, is within ±30% of the average particle diameter. By virtue of this, a lowering in transmittance caused by light scattering can be effectively suppressed, and, in its turn, a much improvement in transparency of the formed colored pixels can be attained over the transparency of colored pixels obtained using conventional pigment-dispersed systems.

Further, the insoluble pigment produced from the coloring material has excellent display quality, and thus can easily form colored pixels which have ideal spectral characteristics as a color filter, specifically have a spectral characteristic curve in a visible region such that the light transmittance in a light absorption region is in the range of 0 to 20% while the light transmittance in a light transmission region is not less than 50%.

The amount of the insoluble pigment produced from the coloring material can be regulated by regulating the solid content of the matrix, specifically can be regulated in the range of 10 to 90% by weight in terms of the content of the insoluble pigment on a solid basis in the colored pixels of the color filter, and, thus, the insoluble pigment can be easily used in higher concentration. Therefore, the contrast can also be significantly improved over the contrast attained in the conventional pigment-dispersed system, and can be set, for example, at not less than 2,000.

According to the present invention, the formation of a colored layer comprising an insoluble pigment, produced from the coloring material, dispersed in a transparent resin can constitute a color filter for use in liquid crystal displays, various solid-state image sensing devices, color video cameras or the like.

More specifically, a composition containing a coloring material is coated on a substrate for constituting a color filter by coating means, such as a spinner, a roll coater, a dip coater, or a bar coater, to a coating thickness of about 0.1 to 10 μm on a dry basis to form a colored layer.

Further, desired colored layers of a plurality of colors may be formed by predetermined patterning to prepare a color filter.

In the production of color filters, a suitable binder component is used in combination with photolithography, ink jet recording, electrodeposition, sublimation dye thermal transfer recording (thermal dye transfer recording) or the like. The coloring material according to the present invention can be advantageously used in all of these cases.

In general, for example, a color filter for TFT comprises: a glass substrate; and, provided on the glass substrate, a black portion for light shielding, each colored portion of RGB for color display, a transparent protective layer for protecting these colored layers, and a transparent conductive layer for driving a liquid crystal.

Photosensitive resin compositions usable in the production of color filters include, for example, those disclosed in U.S. Pat. No. 3,549,367, such as a photopolymerizable unsaturated monomer comprising an addition polymerizable unsaturated monomer, a photopolymerization initiator, and a binder, a photopolymerizable photosensitive composition, and a photocrosslinkable photopolymer having an unsaturated double bond reside on its main chain or side chain. The addition polymerizable unsaturated monomer contained in the photopolymerizable photosensitive composition is preferably a compound which has at least one addition polymerizable ethylenically unsaturated group and has a boiling point of 100° C. or above at normal pressure. Specific examples of such compounds include monofunctional acrylates and methacrylates and compound produced by adding ethylene oxide or propylene oxide to polyfunctional alcohols and then methacrylating the addition product. Additional examples of addition polymerizable unsaturated monomers usable herein include polyfunctional acrylates or methacrylates, such as polyester acrylates and epoxy acrylates produced by reacting an epoxy resin with methacrylic acid, photocurable monomers and oligomers, butyral resins, styrene-maleic acid copolymers, polyvinyl acetate, and phenolic resins. The amount of the photopolymerizable component used is preferably about 5 to 50% by weight.

Photopolymerization initiators include conventional compounds, for example, vicinal polyketoaldonyl compounds, α-carbonyl compounds, asioin ethers, various quinone compounds, a combination of triallylimidazole dimer with p-aminophenyl ketone, and trioxadiazole compounds. Particularly preferred is 2-benzyl-2-dimethylamino-1-(4-morpholinophenyl)butanone (Irgacure 369, manufactured by Chiba Geigy).

The binder is preferably linear organic high-molecular weight polymers which are compatible with the above monomers, soluble in organic solvents, and developable with an aqueous weakly alkaline solution. More specifically, methacrylic acid copolymers, acrylic acid copolymers, itaconic acid copolymers, crotonic acid copolymers, maleic acid copolymers, partially esterified maleic acid copolymers and the like may be used. In addition, water-soluble polymers may also be used. Further, alcohol-soluble nylon and the like may be used from the viewpoint of improving the strength of the cured layer. The content of the binder component is suitably less than 90% by weight, preferably 30 to 85% by weight. Further, if necessary, thermal polymerization inhibitors may also be added.

Suitable organic solvents for the photosensitive resin composition usable herein include glycol ether compounds, acetates thereof, acetic ester compounds, and ketone compounds. The concentration of the solution is suitably not more than 70%, preferably 15 to 50%.

According to a preferred embodiment of the present invention, the photosensitive resin composition with the coloring material dispersed therein is provided, and coated on a substrate, followed by exposure and then development to perform patterning. This procedure can be repeated three times in total respectively for R, G, and B to prepare a predetermined color filter.

Third Invention

The coloring material according to the third invention is characterized by comprising a specific pyrrole derivative represented by formulae (I) to (V) described later.

The coloring material according to the present invention contains a pyrrolo[3,4-c]pyrrole derivative produced by converting at least one ketopyrrole group in a pyrrolo[3,4-c]pyrrole of formula

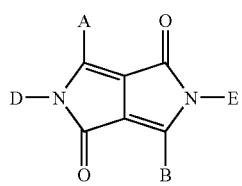
(I)

wherein A and B are each independently of the other a group of formula

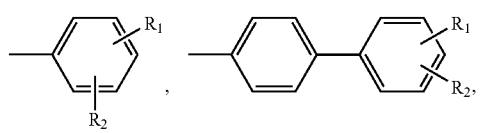

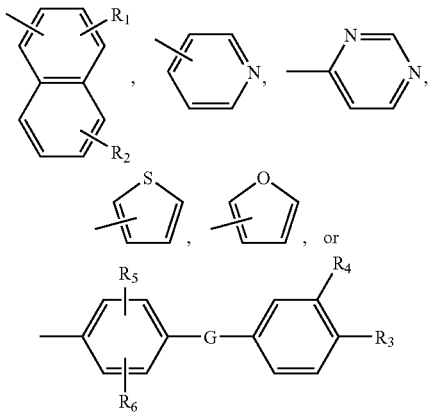

wherein $R_1$ and $R_2$ are each independently of the other hydrogen, halogen, $C_1$–$C_{18}$ alkyl, $C_1$–$C_{18}$ alkoxy, $C_1$–$C_{18}$ alkylmercapto, $C_1$–$C_{18}$ alkylamino, —CN, —NO$_2$, phenyl, trifluoromethyl, $C_5$–$C_6$ cycloalkyl, —C=N—($C_1$–$C_1$ alkyl), a group of formula

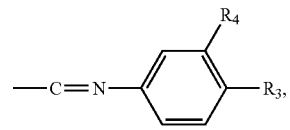

imidazolyl, pyrrazolyl, triazolyl, piperazinyl, pyrrolyl, oxazolyl, benzoxazolyl, benzothiazolyl, benzimidazolyl, morpholinyl, piperidinyl, or pyrrolidinyl; G is —CH$_2$—, —CH(CH$_3$)—, —CH(CH$_3$)$_2$—, —CH=N—, —N=N—, —O—, —S—, —SO—, —SO—, or —NR$_7$—; $R_3$ and $R_4$ are each independently of the other hydrogen, halogen, $C_1$–$C_{18}$ alkoxy, or —CN; $R_5$ and $R_6$ are each independently of the other hydrogen, halogen, or $C_1$–$C_6$ alkyl; and $R_7$ is hydrogen or $C_1$–$C_6$ alkyl; and D and E are each independently of the other a group of formula

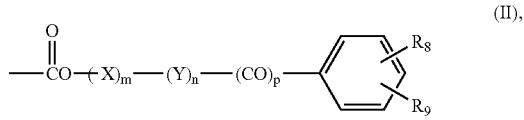
(II),

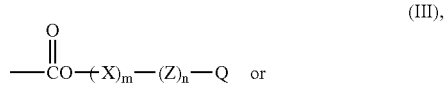
(III),

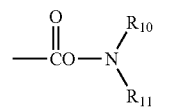
(IV)

wherein, in the formulae (II), (III), and (IV), m, n, and p are each independently of one another a number of 0 or 1; X is $C_1$–$C_{14}$ alkylene or $C_2$–$C_6$ alkenylene; Y is a group —V—(CH$_2$)$_q$—; Z is group —V—(CH$_2$)$_r$—; V is $C_3$–$C_6$ cycloalkylene; q is an interger from 1 to 6; r is an integer from 0 to 6; $R_8$ and $R_9$ are each independently of the other hydrogen, $C_1$–$C_6$ alkyl, $C_1$–$C_4$ alkoxy, halogen, CN, NO$_2$, unsubstituted phenyl or phenoxy, or phenyl or phenoxy which is substituted by $C_1$–$C_4$ alkyl, $C_1$–$C_4$ alkoxy, or halogen; and Q is hydrogen, CN, $Si(R_8)_3$, a group $C(R_{12})(R_{13})(R_{14})$ wherein $R_{12}$, $R_{13}$, and $R_{14}$ are halogen, a group of formula

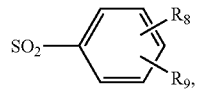

wherein $R_8$ and $R_9$ are as defined above, a group $SO_2R_{15}$ or $SR_{15}$ wherein $R_{15}$ represents phenyl which is substituted by a $C_1$–$C_4$ alkyl, a $C_1$–$C_4$ alkoxy, or a halogen, or a group of formula

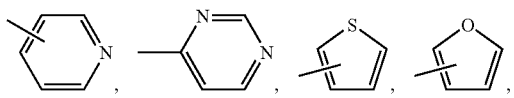

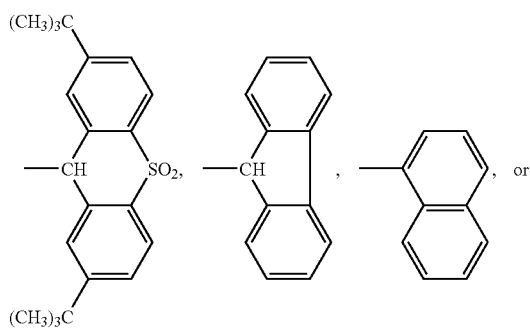

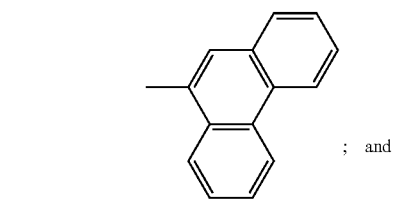

; and $R_{10}$ and $R_{11}$ are each independently of the other hydrogen, $C_1$–$C_{18}$ alkyl, or a group of formula

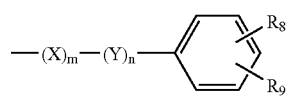

wherein X, Y, $R_8$, $R_9$, m, and n are as defined above, or $R_{10}$ and $R_{11}$, together with the linking nitrogen atom, form pyrrolidinyl, piperidinyl, or morpholinyl radical; and D may be hydrogen, with the proviso that, if D and/or E are a group of formula (III), Q is hydrogen, and n is 0, m must be 1 and X must be a $C_2$–$C_{14}$ alkylene or $C_2$–$C_8$ alkenylene group which is branched at the carbon atom attached to the oxygen atom, said at least one ketopyrrole group being converted to

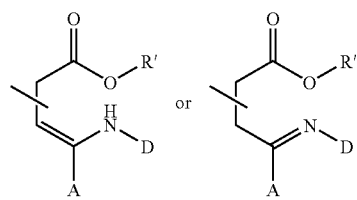

(V)

wherein A may be B with the proviso that, if A is B, D is E; and R' is $C_1$–$C_5$ alkyl.

In this case, A and B in formula (V) are preferably each independently of the other a group of formula

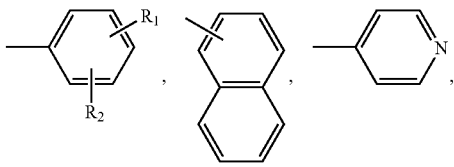

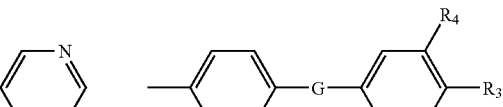

, or wherein $R_1$ and $R_2$ are each independently of the other hydrogen, chloro, bromo, $C_1$–$C_4$ alkyl, $C_1$–$C_6$ alkoxy, $C_1$–$C_6$ alkylamino, CN, or phenyl; G is —O—, —$NR_7$—, —N=N—, or —$SO_2$—; $R_7$ is hydrogen, methyl, or ethyl; and $R_3$ and $R_4$ are hydrogen.

According to a preferred embodiment of the present invention, A and B in formula (V) are identical to each other.

Further, according to another preferred embodiment of the present invention, A and B in formula (V) are a group of formula

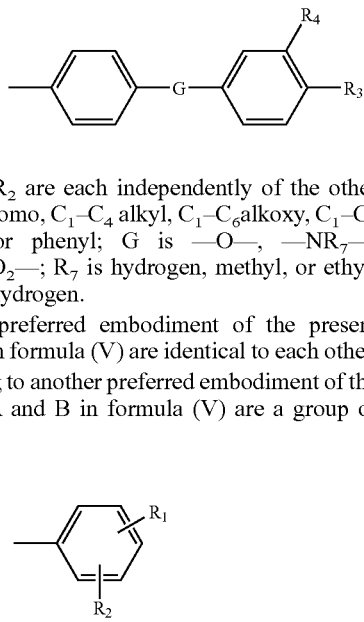

wherein $R_1$ and $R_2$ are each independently of the other hydrogen, methyl, tert-butyl, chloro, bromo, CN, or phenyl.

According to another embodiment, in the coloring material containing a pyrrolo[3,4-c]pyrrole derivative according to claim 1, D is hydrogen or E, and E is a group of formula

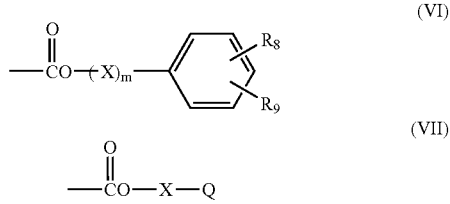

(VI)

(VII)

or formula (IV) wherein, in formulae (VI), (VII), and (IV), m is 0 or 1; X is $C_1$–$C_4$ alkylene or $C_1$–$C_5$ alkenylene; $R_8$ and $R_9$ are each independently of the other hydrogen, $C_1$–$C_4$ alkyl, methoxy, chloro, or —$NO_2$—; Q is hydrogen, CN, $CCl_3$, a group of formula

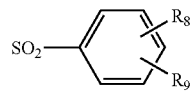

wherein $R_8$ and $R_9$ are as defined above, $SO_2$, $SH_3$, or $SCH_3$; $R_{10}$ and $R_{11}$ are each independently of the other hydrogen, $C_1$–$C_4$ alkyl, or a group of formula

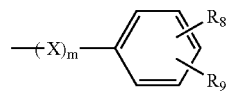

or $R_{10}$ and $R_{11}$, taken together, form a piperidinyl radical, with the proviso that, if D and/or E are a group of formula (IX) and Q is hydrogen, X must be a group of formula

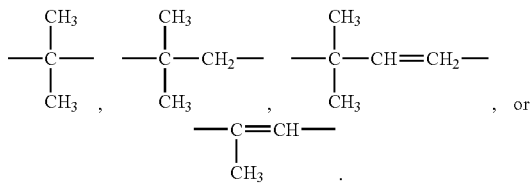

Further, a pyrrolo[3,4-c]pyrrole derivative, wherein D and E in formula (V) are identical to each other and are a group of formula

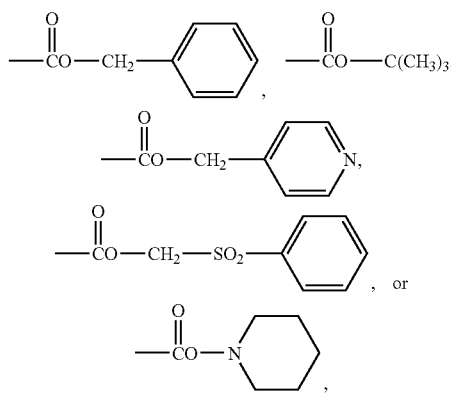

also falls within the scope of the present invention.

The pyrrolo[3,4-c]pyrrole derivative of formula (V) may be produced by reacting a pyrro[3,4-c]pyrrole of formula (I) in a solvent including a lower alcohol and in the presence of a base as a catalyst preferably at a temperature of 0 to 400° C., more preferably at a temperature of 20 to 200° C., for 2 to 80 hr.

Pyrrolo[3,4-c]pyrrole compounds of formula (I) are disclosed in detail in Japanese Patent Laid-Open No. 188234/1995, the disclosure of which is incorporated herein by reference.

The coloring material according to the present invention contains a pyrrolo[3,4-c]pyrrole derivative of formula (V).

The coloring material according to the present invention embraces a coloring material which contains as its component a pyrrolo[3,4-c]pyrrole of formula

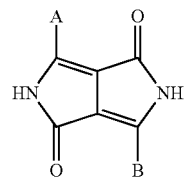

(VIII)

wherein A and B are as defined in formula (I), which has been produced in situ by thermal decomposition, photolysis, or chemical decomposition of the pyrrolo[3,4-c]pyrrole derivative of formula (I).

According to the present invention, the formation of a colored layer comprising an insoluble pigment, produced from the coloring material, dispersed in a transparent resin can constitute a color filter for use in liquid crystal displays, various solid-state image sensing devices, color video cameras or the like.

More specifically, a composition containing a coloring material is coated on a substrate for constituting a color filter by coating means, such as a spinner, a roll coater, a dip coater, or a bar coater, to a coating thickness of about 0.1 to 10 μm on a dry basis to form a colored layer.

Further, desired colored layers of a plurality of colors may be formed by predetermined patterning to prepare a color filter.

In the production of color filters, a suitable binder component is used in combination with photolithography, ink jet recording, electrodeposition, sublimation dye thermal transfer recording (thermal dye transfer recording) or the like. The coloring material according to the present invention can be favorably used in all of these cases.

In general, for example, a color filter for TFT comprises: a glass substrate; and, provided on the glass substrate, a black portion for light shielding, each colored portion of RGB for color display, a transparent protective layer for protecting these colored layers, and a transparent conductive layer for driving a liquid crystal.

Photosensitive resin compositions usable in the production of color filters include, for example, those disclosed in U.S. Pat. No. 3,549,367, such as a photopolymerizable unsaturated monomer comprising an addition polymerizable unsaturated monomer, a photopolymerization initiator, and a binder, a photopolymerizable photosensitive composition, and a photocrosslinkable photopolymer having an unsaturated double bond reside on its main chain or side chain. The addition polymerizable unsaturated monomer contained in the photopolymerizable photosensitive composition is preferably a compound which has at least one addition polymerizable ethylenically unsaturated group and has a boiling point of 100° C. or above at normal pressure. Specific examples of such compounds include monofunctional acrylates and methacrylates and compound produced by adding ethylene oxide or propylene oxide to polyfunctional alcohols and then methacrylating the addition product. Additional examples of addition polymerizable unsaturated monomers usable herein include polyfunctional acrylates or methacrylates, such as polyester acrylates and epoxy acrylates produced by reacting an epoxy resin with methacrylic acid, photocurable monomers and oligomers, butyral resins, styrene-maleic acid copolymers, polyvinyl acetate, and phenolic resins. The amount of the photopolymerizable component used is preferably about 5 to 50% by weight.

Photopolymerization initiators include conventional compounds, for example, vicinal polyketoaldonyl compounds, α-carbonyl compounds, asioin ethers, various quinone compounds, a combination of triallylimidazole dimer with p-aminophenyl ketone, and trioxadiazole compounds. Particularly preferred is 2-benzyl-2-dimethylamino-1-(4-morpholinophenyl)butanone (Irgacure 369, manufactured by Chiba Geigy).

The binder is preferably linear organic high-molecular weight polymers which are compatible with the above monomers, soluble in organic solvents, and developable with an aqueous weakly alkaline solution. More specifically, methacrylic acid copolymers, acrylic acid copolymers, itaconic acid copolymers, crotonic acid copolymers, maleic acid copolymers, partially esterified maleic acid copolymers and the like may be used. In addition, water-soluble polymers may also be used. Further, alcohol-soluble nylon and the like may be used from the viewpoint of improving the strength of the cured layer. The content of the binder component is suitably less than 90% by weight, preferably 30 to 85% by weight. Further, if necessary, thermal polymerization inhibitors may also be added.

Suitable organic solvents for the photosensitive resin composition usable herein include glycol ether compounds, acetates thereof, acetic ester compounds, and ketone compounds. The concentration of the solution is suitably not more than 70%, preferably 15 to 50%.

According to a preferred embodiment of the present invention, the photosensitive resin composition with the coloring material dispersed therein is provided, and coated on a substrate, followed by exposure and then development to perform patterning. This procedure is repeated three times in total respectively for R, G, and B to prepare a predetermined color filter.

EXAMPLES

The present invention will be described in more detail with reference to the following examples. In the following examples, all "parts" are by weight, and all "%" are by weight.

Example A1

(1) Preparation of Solution 4 parts of N,N'-bis-tert-amyloxycarbonyl-1,4-diketo-3,6-di(4'-chlorophenyl)pyrrolo-[3,4-c]pyrrole (DPP) was dissolved in 76 parts of methoxypropyl acetate (PGMEA) which had been dried over Molecular Sieves 4A. The solution was filtered through a 0.1-μm filter. To this solution was added a solution of 1.36 parts of Disperbyk-164 (manufactured by Bik-Chemie Japan K. K., solid content 60%, amine value 18 mg KOH/g) in 1.64 parts of PGMEA. The mixture was stirred at room temperature to prepare a transparent orange solution.

(2) Preparation of Concentrated Solution 0.32 part of a 10% hydrochloric acid-methanol solution dissolved in a minor amount of PGMEA was added dropwise to and mixed with the solution prepared in (1) over a period of one hr at a temperature of 40° C. The mixture was stirred for additional one hr. The resultant solution was a transparent fluorescent yellow solution. This solution was concentrated at a temperature of 40° C. in vacuo to bring the total amount of the solution to 40 parts. The concentrated solution was free from precipitates and was a transparent orange solution.

(3) Identification by Thin-layer Chromatography

The solution prepared in (1), the concentrated solution prepared in (2), and a solution of 0.5 part of DPP in 4.5 parts of PGMEA were developed with cyclohexane cyclohexanone=7:3. As a result, a single spot appeared at rf=0.8 for the solution prepared in (1) and the solution of DPP in PGMEA, and at rf=0.7 for the concentrated solution prepared in (2).

(4) Isolation of Solidified Coloring Material

The concentrated solution prepared in (2) was allowed to stand to precipitate yellow crystals which were then collected, followed by recrystallization. The purified product was then dried in vacuo overnight to prepare a solidified coloring material. A $^1$H-NMR spectrum chart for the solidified coloring material thus obtained is shown in FIG. 1. The solubility of the isolated solidified coloring material in solvents was 10% by weight for PGMEA, 15% by weight for cyclohexane, 10% by weight for chloroform, and 5% by weight for ethyl acetate. The solubility of DPP in solvents was 5% by weight for PGMEA, 10% by weight for cyclohexane, 10% by weight for chloroform, and not more than 1% by weight for ethyl acetate. Thus, there was a difference in solubility among the solvents.

Further, a solution prepared by redissolving the isolated solidified coloring material in cyclohexanone was free from precipitates and stable even when the solid content exceeded 15% by weight.

(5) Preparation of Coating Solution and Coating 10 parts by weight of a phenolic resin (polyvinylphenol PHM-C, manufactured by Maruzen Petrochemical Co., Ltd.) was dissolved in and mixed with 100 parts by weight of a 10 wt % clear solution prepared by redissolving the solidified coloring material prepared in (4) in PGMEA. The coating liquid thus obtained was filtered through a 0.1-μm filter, and then coated by means of a spin coater on a glass substrate of 5 cm×5 cm with a thickness of 1.1 mm. The coated substrate was dried at room temperature for 30 min and on a hot plate of 90° C. for one min. This dye coating was heated in an oven of 200° C. for 5 min. Thus, a red pigment coating having high transmittance was prepared.

(6) Evaluation of Coating

For the red coating prepared in (5), the content of the insoluble pigment was 30% by weight on a solid basis, and the light transmittance was not more than 10% in a light absorption region at not more than 570 nm, and was not less than 87% in a light transmission region at not less than 620 nm. The contrast ratio was measured, and found to be 3,600. An attempt has been made to mechanically disperse the same pigment as used in the red coating with the aid of a dispersant. As a result, the pigment could not be dispersed at all, and any coating could not be formed.

The size of the insoluble pigment particles in the red coating prepared in (5) was measured based on a sectional transmission electron photomicrograph of the coating. As a result, it was found that the average particle diameter was 10 nm with the particle size distribution being within ±20%, that is, in the range of 8 to 12 nm.

Comparative Example A1

The solution prepared in (1) of Example A1 was concentrated in vacuo at a temperature of 40° C. without adding hydrochloric acid until the total amount of the solution became 2.5 parts. Precipitates were found in the concentrated solution. The comparison of this result with the result of Example A1 reveals that the step of conversion to a pigment is necessary to provide a highly concentrated solution.

Comparative Example A2

A solution was prepared in the same manner as in (1) of Example A1, except that a solution of 0.013 part of Disperbyk-180 (solid content 79%, amine value 96 mg KOH/g, acid value 95 mg KOH/g), instead of Disperbyk-164, in 0.1 part of PGMEA was added followed by stirring at room temperature to prepare a transparent orange solution. 0.04 part of a 10% hydrochloric acid-methanol solution was added dropwise to and mixed with this solution. The mixture was stirred at a temperature of 40° C. for one hr. Orange precipitates were found in the resultant solution.

Comparative Example A3

A solution was prepared in the same manner as in (1) of Example A1, except that a solution of 0.019 part of Disperbyk-110 (solid content 52%, acid value 95 mg KOH/g), instead of Disperbyk-164, in 0.1 part of PGMEA was added followed by stirring at room temperature to prepare a transparent orange solution. 0.04 part of a 10% hydrochloric acid-methanol solution was added dropwise to and mixed with this solution. The mixture was stirred at a temperature of 40° C. for one hr. Orange precipitates were found in the resultant solution.

Thus, according to the present invention, in dissolving (1) a soluble pigment precursor, which is convertible into an insoluble pigment, in (2) a solvent capable of dissolving the soluble pigment precursor therein, (3) a stabilizing agent, comprising an organic compound having a structure or a functional group capable of stabilizing dispersibility of the insolubilized pigment in the solvent, is allowed to further exist, and, in this system, the soluble pigment precursor is converted into an insoluble pigment. By virtue of this, the coloring material, even when concentrated after the conversion of the soluble precursor apt to constitute an unstable system to the pigment, is free from any precipitate and any significant floating matter. Therefore, the preparation of a highly concentrated solution of the soluble precursor, a part of which has been converted to an insoluble pigment, can be easily realized. This can overcome the above problems caused by conversion to a (insoluble) pigment, for example, after coating formation.

Further, this coloring material, upon removal of the solvent, can be collected as a crystallized solid. This solidified product can be easily redissolved in a solvent to prepare a stable highly concentrated solution from which impurities have been removed as much as possible.

The coloring material having the above properties according to the present invention can easily form a pigment-dispersed polymer layer which contains a pigment in high concentration and has excellent coating smoothness. This makes it possible to apply the coloring material to color filters having improved spectral characteristics (higher color purity, higher transmittance, and higher contrast) as compared with color filters using conventional coloring materials.

Further, according to the present invention, an organic material, which has a specific structure or functional group having affinity for a soluble pigment precursor and/or a (insoluble) pigment in a medium such as a solvent, and a soluble pigment precursor are dissolved in a medium to saturation, and, in this state or alternatively through chemical, thermal, photolytic, or radiation induced means, at least a part of the precursor is converted to a pigment, followed by concentration. In this case, by virtue of the presence of the organic material having a specific structure or functional group having affinity for the soluble pigment precursor and/or the (insoluble) pigment in the medium, the coloring material, even when concentrated after the conversion of the soluble precursor apt to constitute an unstable system to the pigment, is free from any precipitate and any significant organic matter. Therefore, the preparation of a highly concentrated solution of the soluble precursor, a part of which has been converted to an insoluble pigment, can be easily realized. This can overcome the above problems caused by conversion to a (insoluble) pigment, for example, after coating formation.

Further, according to the present invention, the coloring material can easily form a pigment-dispersed polymer layer which contains a pigment in high concentration and has excellent coating smoothness. This makes it possible to provide color filters having improved spectral characteristics (higher color purity, higher transmittance, and higher contrast) as compared with color filters using conventional coloring materials.

Example B1

(1) Preparation of Suspension 0.98 part of N,N'-bis-tert-amyloxycarbonyl-1,4-diketo-3,6-di(4'-chlorophenyl)pyrrolo[3,4-c]pyrrole (DPP) was added to 100 parts of methanol which had been dried over Molecular Sieves 4A. To this suspension was added 0.12 part of 4-dimethylaminopyridine. The mixture was stirred at room temperature to prepare a yellow suspension.

(2) Preparation of Dissolved Colored Solution

The suspension prepared in (1) was stirred at a temperature of 60° C. for 2 hr. Thus, a clear solution was prepared. Since a very small amount of a red solid came to precipitate, the red solid was removed through a filter. The filtrate thus obtained was an orange clear solution.

(3) Isolation of Solidified Coloring Material (Ring Opened Latent Pigment)

The solution prepared in (2) was concentrated in vacuo at a temperature of 40° C. until the total amount of the solution became 30 parts. The concentrated solution was cooled in ice to precipitate a yellow solid. The precipitated yellow solid was collected through a filter. The yellow solid was then dried in vacuo at a temperature of 40° C. overnight. Thus, 0.5 part of a yellow powder (compound 1) represented by the following general formula, wherein one ketopyrrole ring of DPP had been subjected to methanolysis to cleave a bond between N and C=O, was obtained.

Compound 1

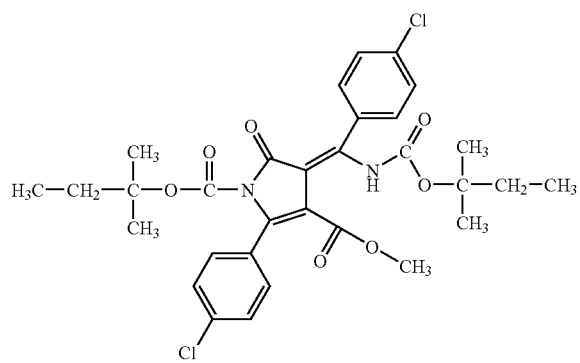

(4) Identification by Thin-layer Chromatography

The suspension prepared in (1), the solution prepared in (2), and a solution of 0.05 part of the compound (compound 1) prepared in (3) in 5 parts of tetrahydrofuran (THF), and a solution of 0.05 part of DPP in 5 parts of THF were developed with cyclohexane:THF=4:1. As a result, for the suspension prepared in (1) and the solution of DPP in THF, a single spot appeared at rf=0.67. For the solution prepared in (2), two spots appeared, one of which was a large spot at rf=0.6 and the other was a thin small spot at rf=0.45. For the solution of the compound prepared in (3) in THF, a single spot appeared at rf=0.6.

(5) Properties and Solubility of Compound 1

Figure 3:
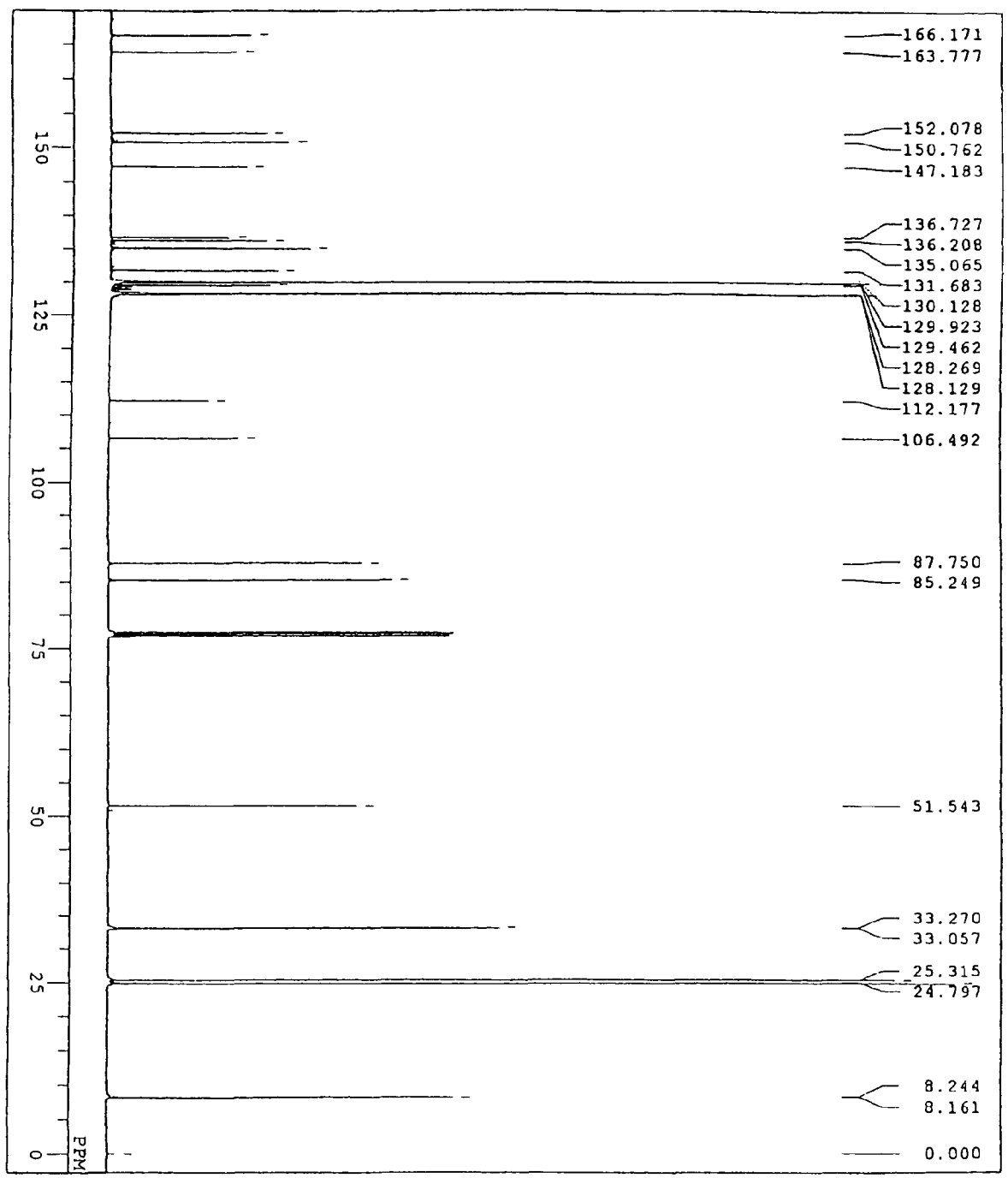

For compound 1 prepared in (3), a $^1$H-NMR spectrum chart is shown in FIG. 2, and a $^{13}$C-NMR spectrum chart is shown in FIG. 3. The solubility of compound 1 in solvents was 50% by weight for chloroform, 28.57% by weight for THF, 10% by weight for cyclohexanone, 4.55% by weight for ethyl acetate, 2% by weight for methoxypropyl acetate (PGMEA), and 0.2% by weight for methanol. Thus, there was a difference in solubility among the solvents.

(6) Preparation of Coating Solution and Coating 3.4 parts of Disperbyk-164 (manufactured by Bik-Chemie Japan K. K., solid content 60%, amine value 18 mg KOH/g) and 5 parts of a phenolic resin (polyvinylphenol PHM-C, manufactured by Maruzen Petrochemical Co., Ltd.) were dissolved in and mixed with 100 parts of a 10 wt % clear solution prepared by dissolving compound 1 prepared in (3) in THF. The coating liquid thus obtained was filtered through a 0.45-μm filter, and then coated by means of a spin coater on a glass substrate of 5 cm×5 cm with a thickness of 0.7 mm. The coated substrate was dried at room temperature for 30 min. The coating was then heated in an oven of 180° C. for 60 min. Thus, a red pigment coating having high transmittance was prepared.

(7) Evaluation of Coating

For the red coating prepared in (6), the content of the insoluble pigment was 20% by weight on a solid basis, and the light transmittance was not more than 10% in a light absorption region at not more than 570 nm, and was not less than 87% in a light transmission region at not less than 620 nm. The contrast ratio was measured, and found to be 2,500.

The size of the pigment particles in the red coating prepared in (6) was measured based on a sectional transmission electron photomicrograph of the coating. As a result, it was found that the average particle diameter was 10 nm with the particle size distribution being within ±20%, that is, in the range of 8 to 12 nm.

Comparative Example B1

The suspension prepared in (1) of Example B1 was stirred at a temperature of 60° C. for 18 hr to prepare a solution which was then treated in the same manner as in (3). As a result, a yellow powder (compound 2) represented by the following general formula was obtained.

Compound 2

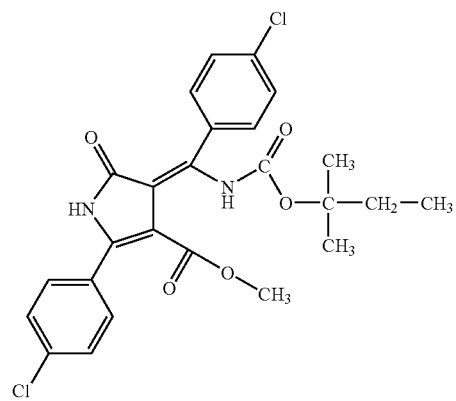

Figure 4:
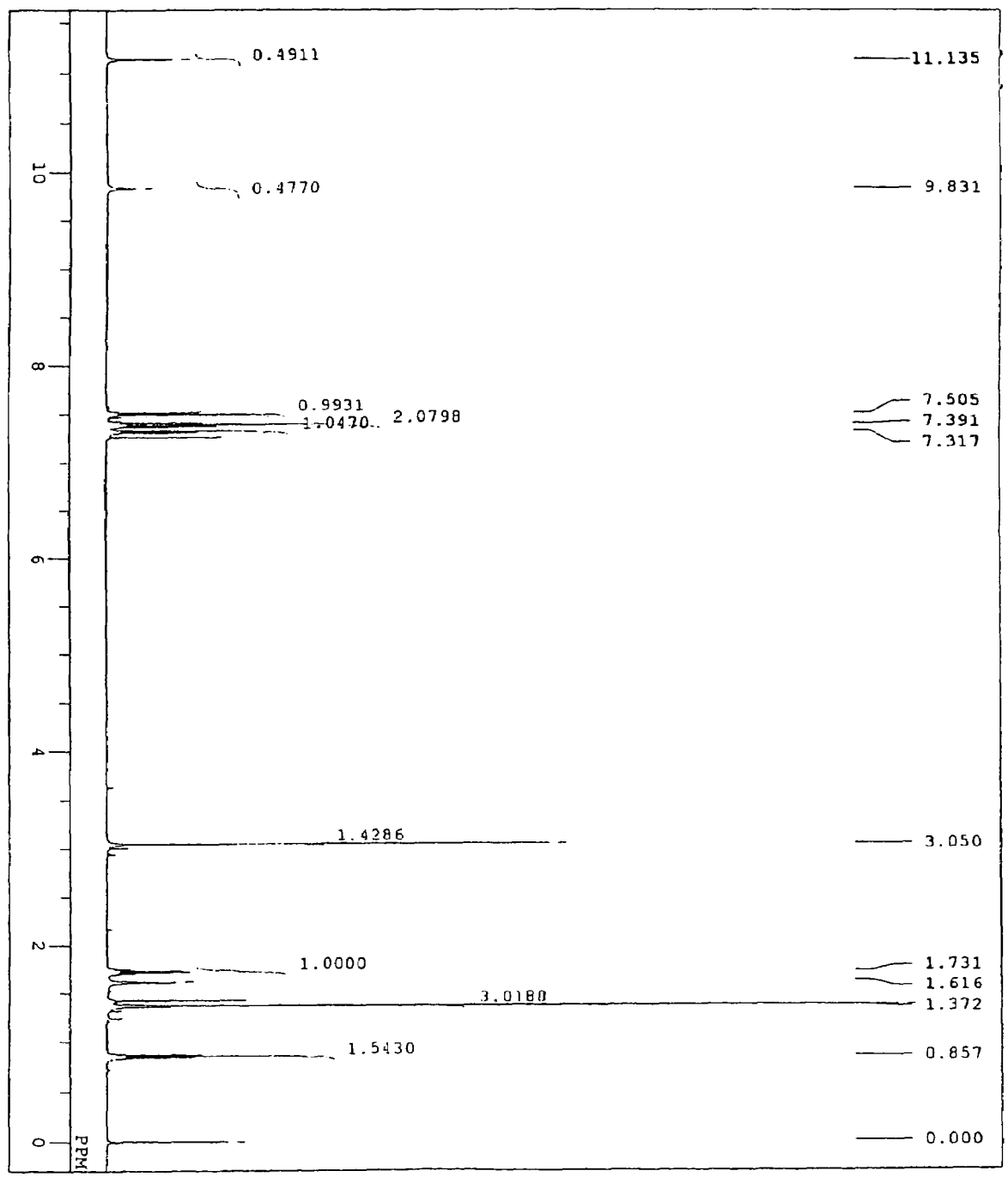
Figure 5:
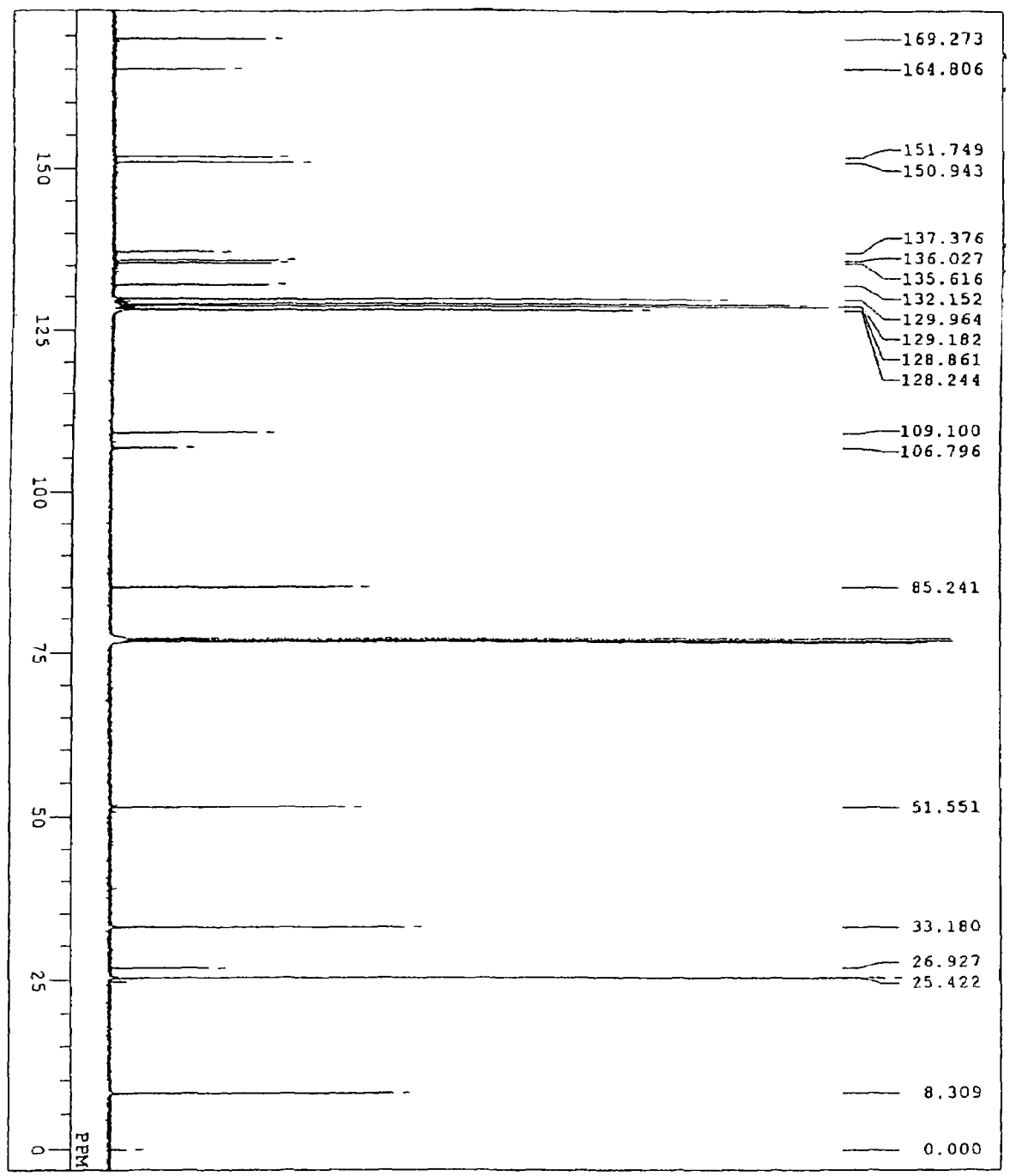

Compound 2 was dissolved in THF, and developed in the same manner as in (4). As a result, a single spot appeared at rf=0.45. For compound 2, a $^1$H-NMR spectrum chart is shown in FIG. 4, and a $^{13}$C-NMR spectrum chart is shown in FIG. 5. The solubility of compound 2 in solvents was 2% by weight for chloroform, 12.5% by weight for THF, 5% by weight for cyclohexanone, 1% by weight for ethyl acetate, 0.67% by weight for methoxypropyl acetate (PGMEA), and 0.1% by weight for methanol. Thus, there was a difference in solubility among the solvents.

Comparative Example B2

It was confirmed that, upon a reaction of compound 2 prepared in Comparative Example B1 with di-tert-amyl dicarbonate in THF in the presence of 4-dimethylaminopyridine, compound 2 was converted to compound 1.

What is claimed is:

1. A color filter comprising a colored layer as colored pixels provided on a transparent substrate, said colored layer containing a pyrrolo[3,4-c]pyrrole derivative produced by converting at least one ketopyrrole group in a pyrrolo[3,4-c]pyrrole of formula

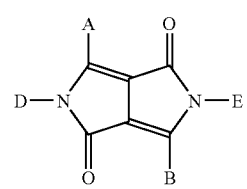

(I)

wherein A and B are each independently of the other a group of formula

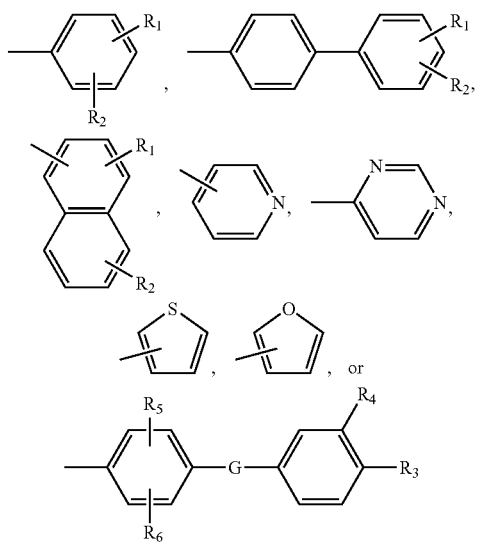

wherein $R_1$ and $R_2$ are each independently of the other hydrogen, halogen, $C_1$–$C_{18}$ alkyl, $C_1$–$C_{18}$ alkoxy, $C_1$–$C_{18}$ alkylmercapto, $C_1$–$C_{18}$ alkylamino, —CN, —NO$_2$, phenyl, trifluoromethyl, $C_5$–$C_6$ cycloalkyl, —C=N—($C_1$–$C_{18}$ alkyl), a group of formula

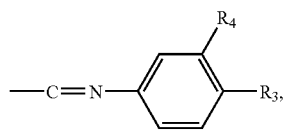

imidazolyl, pyrrazolyl, triazolyl, piperazinyl, pyrrolyl, oxazolyl, benzoxazolyl, benzothiazolyl, benzimidazolyl, morpholinyl, piperidinyl, or pyrrolidinyl; G is —CH$_2$—, —CH(CH$_3$)—, —CH(CH$_3$)$_2$—, —CH=N—, —N=N—, —O—, —S—, —SO—, —SO$_2$— or —NR$_7$; $R_3$ and $R_4$ are each independently of the other hydrogen, halogen, $C_1$–$C_{18}$ alkoxy, or —CN; $R_5$ and $R_6$ are each independently of the other hydrogen, halogen, or $C_1$–$C_6$ alkyl; and R7 is hydrogen or $C_1$–$C_6$ alkyl; and D and E are each independently of the other a group of formula

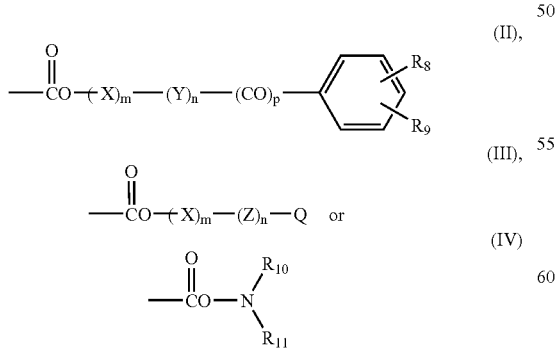

wherein, in the formulae (II), (III), and (IV), m, n, and p are each independently of one another a number of 0 or 1; X is $C_1$–$C_{14}$ alkylene or $C_2$–$C_6$ alkenylene; Y is a group —V—($CH_2)_q$—; Z is a group —V—($CH_2)_r$—; V is $C_3$–$C_6$ cycloalkylene; q is an integer from 1 to 6; r is an integer from 0 to 6; $R_8$ and $R_9$ are each independently of the other hydrogen, $C_1$–$C_6$ alkyl, $C_1$–$C_4$alkoxy, halogen, CN, NO$_2$, unsubstituted phenyl or phenoxy, or phenyl or phenoxy which is substituted by $C_1$–$C_4$ alkyl, $C_1$–$C_4$ alkoxy, or halogen; and Q is hydrogen, CN, Si(R$_8$)$_3$, a group C(R$_{12}$)(R$_{13}$)(R$_{14}$) wherein $R_{12}$, $R_{13}$, and $R_{14}$ are halogen, a group of formula

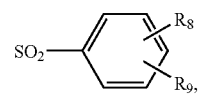

wherein $R_8$ and $R_9$ are as defined above,
a group SO$_2$R$_{15}$ or SR$_{15}$ wherein $R_{15}$ represents phenyl which is substituted by a $C_1$–$C_4$ alkyl, a $C_1$–$C_4$ alkoxy, or a halogen, or a group of formula

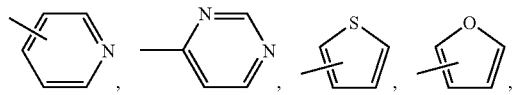

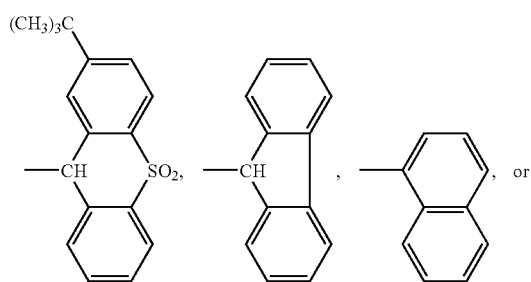

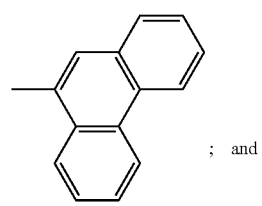

; and $R_{10}$ and $R_{11}$ are each independently of the other hydrogen, $C_1$–$C_{18}$ alkyl, or a group of formula

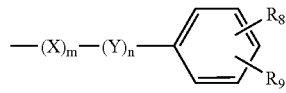

wherein X, Y, $R_8$, $R_9$, m, and n are as defined above, or $R_{10}$ and $R_{11}$, together with the linking nitrogen atom, form pyrrolidinyl, piperidinyl, or morpholinyl radical; with the proviso that, if D and/or E are a group of formula (III), Q is hydrogen, and n is 0, m must be 1 and X must be a $C_2$–$C_{14}$ alkylene or $C_2$–$C_8$ alkenylene group which is branched at the carbon atom attached to the oxygen atom, said at least one ketopyrrole group being converted to

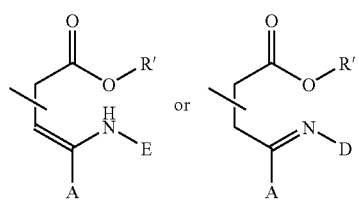

wherein A may be B with the proviso that, if A is B, D is E; and R' is $C_1$–$C_5$ alkyl.

2. The color filter according to claim 1, wherein A and B are each independently of the other a group of formula

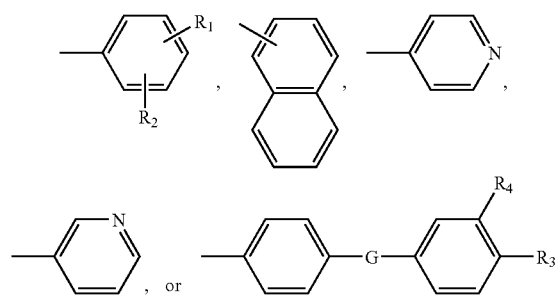

wherein and are each independently of the other chloro, bromo, $C_1$–$C_4$ alkyl, $C_1$–$C_6$ alkoxy, $C_1$–$C_6$ alkylamino, CN, or phenyl; G is —O—, —$NR_7$—, —N=N—, or —$SO_2$—; $R_7$ is hydrogen, methyl, or ethyl; and $R_3$ and $R_4$ are hydrogen.

3. The color filter according to claim 1, wherein A and B are identical to each other.

4. The color filter according to claim 3, wherein A and B are a group of formula

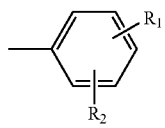

wherein $R_1$ and $R_2$ are each independently of the other hydrogen, methyl, tert-butyl, chloro, bromo, CN, or phenyl.

5. The color filter according to claim 1, wherein D is E, and E is a group of formula

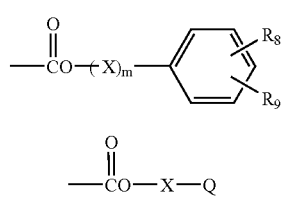

or formula (IV) wherein, in formulae (VI), (VII), and (IV), m is 0 or 1; X is $C_1$–$C_4$ alkylene or $C_1$–$C_5$ alkenylene; $R_8$ and $R_9$ each independently of the other hydrogen $C_1$–$C_4$ alkyl, methoxy, chloro, or —$NO_2$—; Q is hydrogen, CN, $CCl_3$, a group of formula

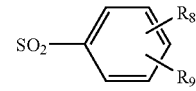

wherein $R_8$ and $R_9$ are as defined above, $SO_2$, $SH_3$, or $SCH_3$; $R_{10}$ and $R_{11}$ are each independently of the other hydrogen, $C_1$–$C_4$ alkyl, or a group of formula

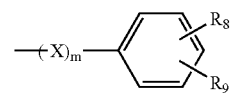

or $R_{10}$ and $R_{11}$, taken together, form a piperidinyl radical, with the proviso that, if D and/or E are a group of formula (VII) and Q is hydrogen, X is a group of formula

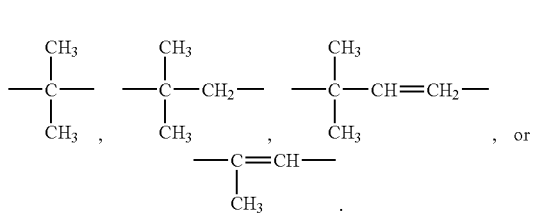

6. The color filter according to claim 1, wherein D and E are identical to each other and are a group of formula

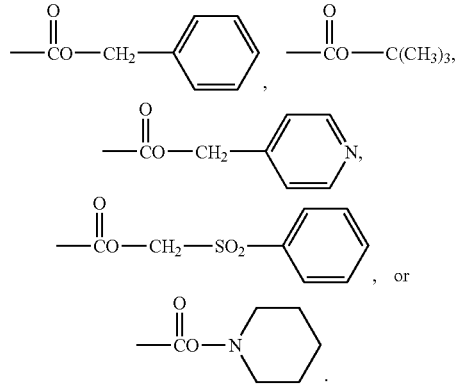

7. The color filter according to claim 1, wherein the pyrrolo[3,4-c]pyrrole derivative is produced by reacting the pyrrolo[3,4-c]pyrrole of formula (I) in a solvent including a lower alcohol and in the presence of a base as a catalyst.

8. The color filter according to claim 7, wherein the reaction is carried out at a temperature of 0 to 400° C. for 2 to 80 hr.

9. The color filter according to claim 7, wherein the reaction is carried out at a temperature of 20 to 200° C.

* * * * *